(12) United States Patent
Zawacki et al.

(10) Patent No.: US 8,452,877 B2
(45) Date of Patent: May 28, 2013

(54) ESTABLISHING A REMOTE DESKTOP

(75) Inventors: Jennifer Greenwood Zawacki, Hillsborough, NC (US); Steven Richard Perrin, Raleigh, NC (US); James Stephen Rutledge, Durham, NC (US); Matthew Roper, Cary, NC (US); Mark Charles Davis, Durham, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 286 days.

(21) Appl. No.: 12/769,472

(22) Filed: Apr. 28, 2010

(65) Prior Publication Data

US 2011/0270991 A1 Nov. 3, 2011

(51) Int. Cl.
G06F 15/16 (2006.01)

(52) U.S. Cl.
USPC .......................................... 709/227; 709/217

(58) Field of Classification Search
USPC ......... 709/202, 212, 217–218, 225, 227–230, 709/237, 242, 245, 249–250
See application file for complete search history.

(56) References Cited

U.S. PATENT DOCUMENTS

| | | | | |
|---|---|---|---|---|
| 4,978,949 A * | 12/1990 | Herron et al. | ................. | 345/168 |
| 5,668,977 A * | 9/1997 | Swanstrom et al. | ............ | 703/23 |
| 5,708,840 A * | 1/1998 | Kikinis et al. | ................ | 708/105 |
| 5,864,708 A * | 1/1999 | Croft et al. | ......................... | 710/1 |
| 5,923,757 A * | 7/1999 | Hocker et al. | ................ | 345/156 |
| 5,930,368 A * | 7/1999 | Hocker et al. | ................ | 380/52 |
| 6,067,076 A * | 5/2000 | Hocker et al. | ................ | 345/158 |
| 6,072,468 A * | 6/2000 | Hocker et al. | ................ | 345/157 |
| 7,028,128 B2 * | 4/2006 | Zhang et al. | .................. | 710/305 |
| 7,143,198 B2 * | 11/2006 | Lee et al. | .......................... | 710/2 |
| 7,340,772 B2 * | 3/2008 | Panasyuk et al. | ............... | 726/15 |
| 7,411,577 B2 * | 8/2008 | Kim et al. | ..................... | 345/156 |
| 7,424,542 B2 * | 9/2008 | Herrod | .......................... | 709/227 |
| 7,457,878 B1 * | 11/2008 | Mathiske et al. | ............. | 709/227 |
| 7,590,075 B2 * | 9/2009 | Pirzada et al. | ............... | 370/254 |
| 7,685,257 B2 * | 3/2010 | King et al. | ..................... | 709/219 |
| 7,751,807 B2 * | 7/2010 | Lin et al. | ....................... | 455/418 |
| 7,753,788 B2 * | 7/2010 | Lum et al. | ....................... | 463/39 |
| 7,764,960 B2 * | 7/2010 | McClung | ..................... | 455/426.1 |
| 7,822,983 B2 * | 10/2010 | Aull et al. | ..................... | 713/172 |
| 7,885,645 B2 * | 2/2011 | Postma et al. | ................ | 455/417 |
| 7,930,454 B2 * | 4/2011 | Rausenberger | ............... | 710/100 |
| 7,970,911 B2 * | 6/2011 | Blatherwick et al. | ......... | 709/227 |
| 8,135,342 B1 * | 3/2012 | Harold | .......................... | 455/41.1 |
| 8,141,135 B2 * | 3/2012 | Nagami et al. | ..................... | 726/5 |
| 8,285,259 B2 * | 10/2012 | Karkanias et al. | .......... | 455/414.1 |
| 2003/0112585 A1 * | 6/2003 | Silvester | ....................... | 361/679 |
| 2004/0114601 A1 * | 6/2004 | Watanabe et al. | .......... | 370/395.2 |
| 2004/0248514 A1 * | 12/2004 | Idani et al. | .................... | 455/41.2 |
| 2005/0157753 A1 * | 7/2005 | Mayer | ............................ | 370/468 |
| 2005/0239496 A1 * | 10/2005 | Sylvain | ........................ | 455/552.1 |

(Continued)

*Primary Examiner* — John Follansbee
*Assistant Examiner* — Madhu Woolcock
(74) *Attorney, Agent, or Firm* — Brian J. Pangrle

(57) ABSTRACT

A method includes receiving an IP address via a non-IP protocol communication interface, the IP address associated with an operating system environment established on a computing device; storing the received IP address in memory; responsive to a cessation of communication via the non-IP protocol communication interface, accessing the IP address stored in memory and transmitting the accessed IP address via an IP protocol network interface; and receiving information via the IP protocol network interface, the information issued by the operating system environment established on the computing device associated with the IP address. Various other apparatuses, systems, methods, etc., are also disclosed.

7 Claims, 8 Drawing Sheets

U.S. PATENT DOCUMENTS

| | | |
|---|---|---|
| 2006/0056446 A1* | 3/2006 | Lee et al. .................... 370/465 |
| 2007/0054627 A1* | 3/2007 | Wormald ...................... 455/70 |
| 2007/0242424 A1* | 10/2007 | Lieu et al. .................... 361/686 |
| 2008/0070619 A1* | 3/2008 | Yu ............................ 455/552.1 |
| 2008/0125039 A1* | 5/2008 | Glinka ........................ 455/41.2 |
| 2009/0222657 A1* | 9/2009 | Bender et al. ................ 713/156 |
| 2010/0060549 A1* | 3/2010 | Tsern .......................... 345/2.1 |
| 2010/0081473 A1* | 4/2010 | Chatterjee et al. ........... 455/559 |
| 2010/0169956 A1* | 7/2010 | Wang ............................ 726/5 |

* cited by examiner

Method
600

Receiving an IP address via a non-IP protocol communication interface, the IP address associated with an operating system environment established on a computing device
610

Storing the received IP address in memory
620

Responsive to a cessation of communication via the non-IP protocol communication interface, accessing the IP address stored in memory and transmitting the accessed IP address via an IP protocol network interface
630 receiving information via the IP protocol network interface, the information issued by the operating system environment established on the computing device associated with the IP address
640

FIG. 6

ESTABLISHING A REMOTE DESKTOP

TECHNICAL FIELD

Subject matter disclosed herein generally relates to techniques for establishing a remote desktop.

BACKGROUND

Computer users increasingly have some combination of low power devices and high power devices. For example, a low power device may be a netbook or tablet while a high power device may be a notebook, a desktop or a server. Some low power devices have been referred to as "companion" devices. For example, a companion device may be quite portable, have a relatively long battery life and be capable of logging into and commanding resources of a high power device. In such an example, the companion device allows a user to roam freely for hours, without having to carry around a heavy high power device or worry about short-lived battery supply of a high power device (e.g., where the high power device has an ample power supply). As described herein, various technologies enhance use of low power and high power devices.

SUMMARY

A method includes receiving an IP address via a non-IP protocol communication interface, the IP address associated with an operating system environment established on a computing device; storing the received IP address in memory; responsive to a cessation of communication via the non-IP protocol communication interface, accessing the IP address stored in memory and transmitting the accessed IP address via an IP protocol network interface; and receiving information via the IP protocol network interface, the information issued by the operating system environment established on the computing device associated with the IP address. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

FIG. 6 is a diagram of an example of a method that includes acting in response to a cessation of communication via a non-IP protocol communication interface;

DETAILED DESCRIPTION

Figure 1:
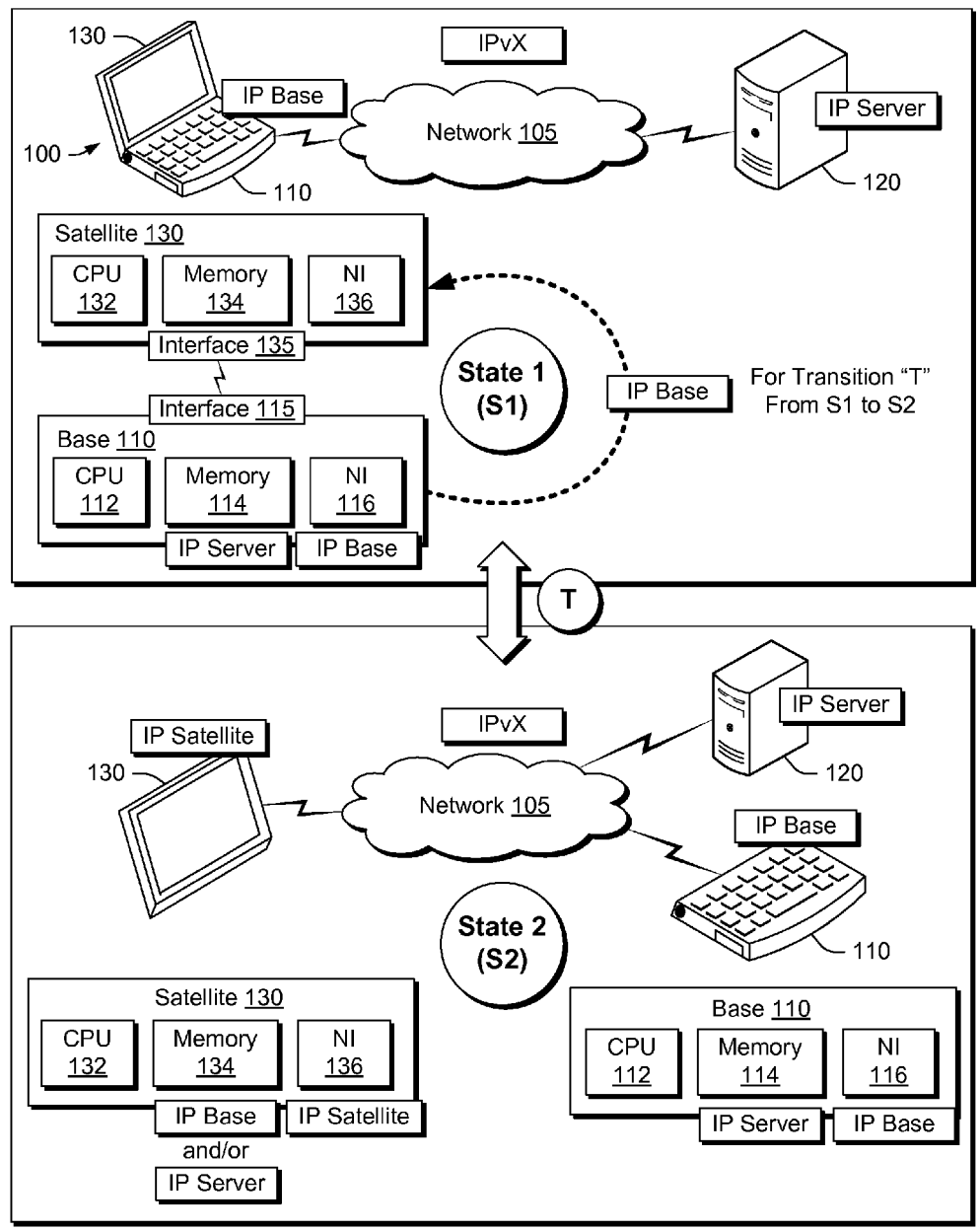
FIG. 1 is a diagram of an example of a system that can transition from a first state to a second state characterized by a remote session.

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Users increasingly desire to access their full computing power from low power devices, such as slates, smartbooks, or smartphones. Various existing remote desktop solutions are geared toward having full power devices on both ends and can require high bandwidth yet provide limited performance. As described herein, various methods can allow for full remote desktop capabilities on a low power device without the performance hit of many conventional solutions. Various examples described herein include a base-satellite system. Various methods may be implemented at least in part on a base component, a satellite component or both a base component and a satellite component. A satellite component ("satellite") may be a detachable device (e.g., where the monitor can be used independently as a slate) that is configured to dock to a base component ("base"). In various examples, a base has a full function processor while a satellite has a low power system.

Various techniques described herein include IP address mirroring, for example, where a low power system is informed of an IP address associated with a high power system. For example, when a satellite is disconnected from its base, a remote desktop application can be activated where the satellite uses a stored IP address associated with its base to establish an IP protocol-based connection. In various examples, a base may communicate an IP address of a device other than the base to a satellite, for example, a base may communicate an IP address of a server. In such a routing system, a base may maintain knowledge of all devices a base connects to and communicate at least some of this knowledge to a satellite to allow the satellite to route directly or indirectly (e.g., via the base) to a particular device for a remote desktop session.

A satellite may include a display, a power supply (e.g., one or more batteries), a low-power processor, network connectivity circuitry, and a touch-enabled user interface (e.g., UI). While a satellite may be configured to browse the Internet, play music, etc., the user experience is typically different from a user experience on a high power computing device.

In conventional systems, a relatively consistent user experience is maintained in a detached mode by installing and running a conventional "remote desktop" client. In such a conventional system, however, the user must manually configure and launch the remote desktop client and then provide credentials to unlock a session under the operating system running on the remote base unit.

As described herein, various technologies allow for a seamless transition to a remote desktop state. For example, a user may be using a base-satellite system in a physically connected state, disconnect the satellite from the base and seamlessly transition to a remote desktop state. In this example, the base may be under control of an operating system (e.g., a WINDOWS® operating system of Microsoft Corporation, Redmond, Wash.) with an active session and upon disconnection of the satellite from the base, the satellite may reconnect to the base via an IP protocol over a network to continue the same session. In such an example, the user may see very little or no perceptible interruption of the session. To achieve such a seamless transition, the base-satellite system is configured to establish a remote desktop session between satellite (e.g., display device) and the base as soon as the user disconnects the satellite. Such a transition may occur automatically in response to disconnection of the base and the satellite (e.g., cessation of communication via a non-IP protocol communication interface), optionally without any user input (e.g., where a disconnect notice serves as a trigger to establish a remote desktop session).

As described herein, a method can use one or more operating system application programming interfaces (APIs) installed on a base to capture user credential information (e.g., as entered at time of logon). The method can then communicate this information from the base to a satellite for storage and later use. A base-satellite system may include a physical switch, an interruptible electrical contact, or an interruptible communication interface that triggers the satellite to take certain actions. For example: upon detaching a satellite from a base, a physical switch may trigger a process that acts to establish communication via an IP-protocol to an IP address that was provided to the satellite by the base prior to the detaching; upon disconnecting an electrical wire (or wires), a satellite may respond to the disconnecting by triggering a process that acts to establish communication via an IP-protocol to an IP address that was provided to the satellite by the base prior to the disconnecting; or, upon interrupting a non-IP protocol communication interface, a satellite may respond to the interrupting by triggering a process that acts to establish communication via an IP-protocol to an IP address that was provided to the satellite by the base prior to the interrupting.

In various examples, a satellite can respond by launching a remote desktop client application, which attempts to communicate with the base unit via an IP protocol. Upon establishing communication, the base may issue a challenge to the satellite for credentials. Upon the satellite's receipt of the challenge, the satellite may access previously stored credentials (e.g., as provided by the base) and transmit these to the base. Upon receipt of the credentials by the base, an authentication process occurs where, if the received credentials are authenticated, the base allows a remote session to be established for use by the satellite.

In the foregoing example, as a security measure, authentication may be used for a finite window of time after the satellite has been detached, disconnected or interrupted. After the window of time passes, an option may exist for the satellite to respond to a pending challenge by displaying a graphical user interface (GUI) that allows a user to enter credentials. A base-satellite system may include an option that prohibits communication of credentials to a satellite to thereby require entry of credentials upon establishment of communication between the base and the satellite via an IP protocol network.

In various examples, a base may provide a satellite with an IP address of a server or other resource. One or more security policies may be associated with IP addresses or resources that dictate the manner by which a satellite can establish a session with an operating system (e.g., whether "physical" or virtual). For example, a security policy may allow for communication of credentials to a satellite for continuing an existing session on a base and another security policy may prohibit communication of credentials to a satellite for continuing an existing session on a server (e.g., where in the "connected" state, the satellite interacted with the server session via the base). In various examples, a session may be an operating system session without virtualization or an operating system session with virtualization (e.g., optionally enable by a hypervisor). In various examples, multiple sessions may optionally be involved.

FIG. 1 shows an example of a system 100 that includes a base 110 and a satellite 130. The system 100, typically via the base 110, may communicate with one or more resources via a network 105. For example, the base 110 may have an associated base IP address that allows it to communicate with a server 120, having an associated server IP address, via the network 105 (e.g., via any of a variety of IP protocols "IPvX"). Where "IP" is mentioned (e.g., with respect to address or protocol), it typically refers to techniques and technology of a multi-layer TCP/IP model (see, e.g., RFC 1122).

In the example of FIG. 1, the base 110 includes at least one CPU 112, memory 114, a non-IP protocol interface 115 and an IP protocol interface 116 (e.g., network interface "NI") and the satellite 130 includes at least one CPU 132, memory 134, a non-IP protocol interface 135 and an IP protocol interface 136 (e.g., network interface "NI"). Where the satellite 130 is a low power device, it may include a single processor. For example, consider the ATOM® family of processors (Intel Corporation, Santa Clara, Calif.), a line of ultra-low-voltage x86 and x86-64 microprocessors designed in 45 nm CMOS and used in various netbooks, nettops, and Mobile Internet devices (MIDs).

As indicated in FIG. 1, the system 100 is configured to operate in State 1 (S1) or State 2 (S2) and transition (T) between S1 and S2. While, in some instances, a system may be configured to operate in both S1 and S2 at the same time, as described herein, various examples pertain more particularly to operation in S1 or S2 and transitions between such states.

In S1, the base 110 communicates its IP address (IP base) to the satellite 130 (e.g., via a communication interface established using interface components 115 and 135, which may be wired or wireless). Once communicated, the system 100 can transition to S2. As indicated, in S2, the satellite 130 relies on its own IP address (IP satellite) to search for IP base via the network 105. The satellite 130 is shown as being configured with IP base, IP server or IP base and IP server stored in the memory 134 and with IP satellite relied upon by the network interface 136. The base 110 is shown in S1 and S2 as being configured optionally with IP server in memory while the network interface 116 relies on IP base. In instances where the satellite 130 establishes communication with the server 120, this may occur directly or indirectly (e.g., via the base 110). Where the satellite 130 communicates directly via the server 120, the base 110 may merely communicate IP server (e.g., and not IP base) to the satellite 130. Other variations are possible given the features shown in FIG. 1 and considered as part of the description herein (e.g., handover from base 110 to server 120 after establishing communication between IP satellite and IP base via network 105, etc.).

Figure 2:
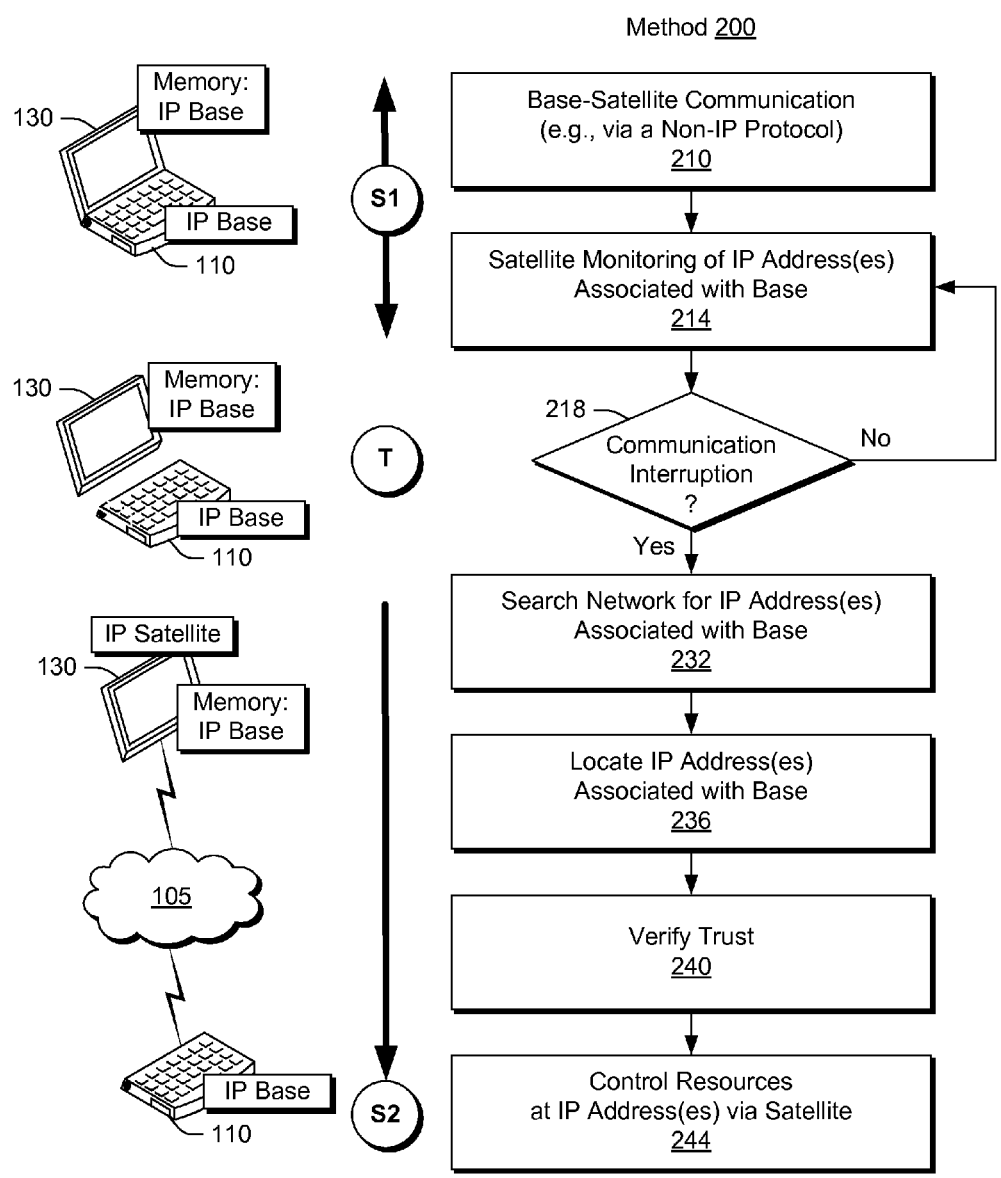
FIG. 2 is a diagram of an example of a method to transition a system from a first state to a second state that allows for remote control of resources.

FIG. 2 shows an example of a method 200. For purposes of describing the method 200, the base 110 and satellite 130 of FIG. 1 are also shown; however, the method 200 is not intended to be limited to the specific base 110 and satellite 130 as a base and a satellite may have features that differ from those shown in FIG. 1.

The method 200 commences in a communication block 210 where a base-satellite system communicate via a non-IP protocol. In a monitoring block 214, the satellite monitors one or more IP addresses associated with the base (e.g., consider IP base, IP server, etc.). In a decision block 218, a decision is made as to whether the communication of block 210 has been interrupted. If the decision block 218 decides that communication has not been interrupted, the method 200 continues at the monitoring block 214; otherwise, the method 200 continues at a search block 232 that searches a network for one or more IP addresses associated with the base. A location block 236 locates at least one of the one or more IP addresses associated with the base, which allows for communication via an IP protocol. A verification block 240 follows that may involve a resource issuing a challenge, a satellite responding to the challenge and the resource (or other resource such as an authentication server) verifying trust. A control block 244 may then be established that allows the satellite to operate in a different state (S2) and control resources at one or more IP addresses.

Figure 3:
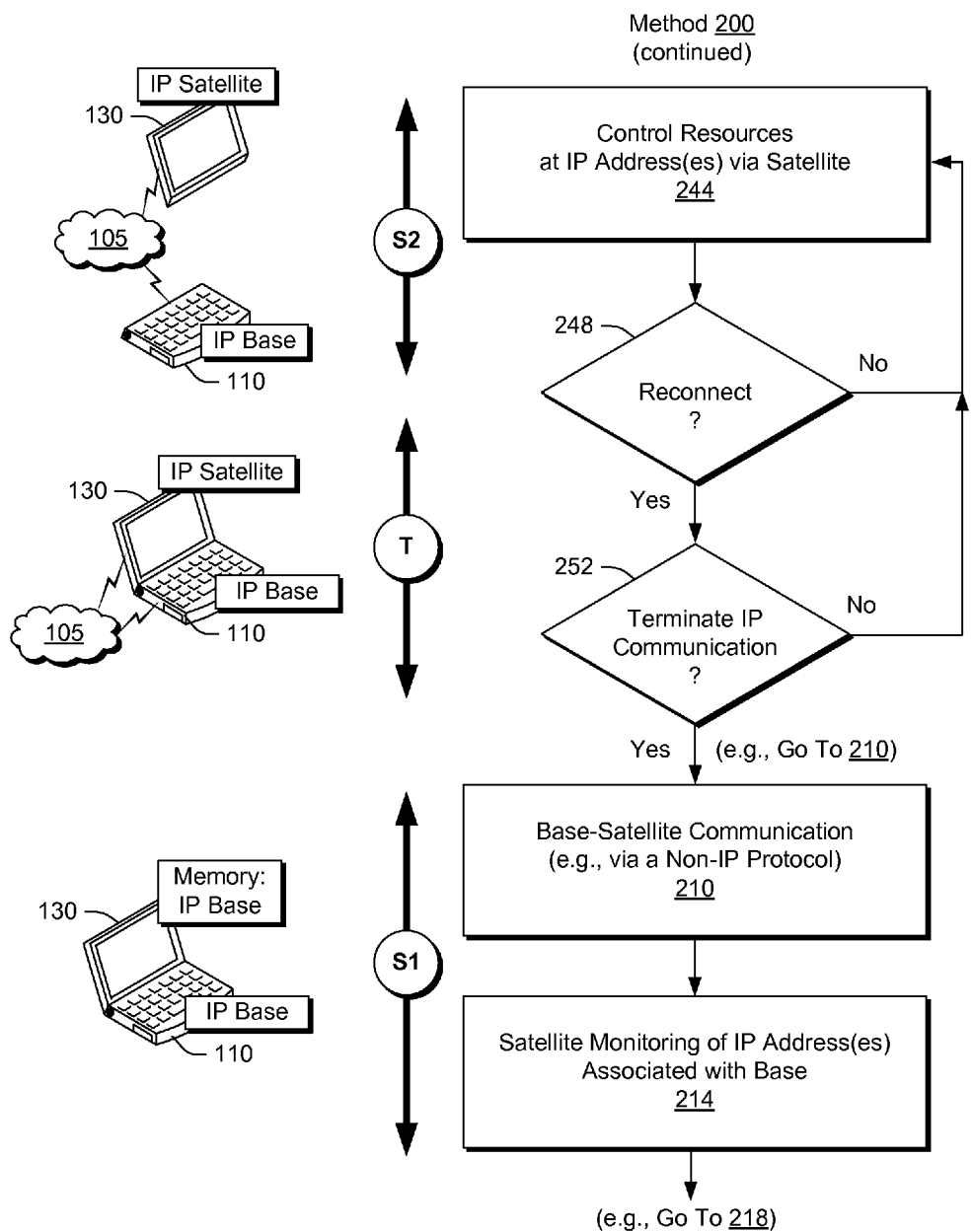
FIG. 3 is a diagram of an example of a method to transition a system from a second state to a first state.

FIG. 3 shows an example for continuation of the method 200 where a transition occurs from S2 to S1. Given the control block 244, a decision block 248 decides whether reconnection has occurred (or will occur, for example, according to receipt of a user input). If the decision block 248 decides that reconnection has not occurred, the method 200 continues at the control block 244; however, if the decision block 248 decides that reconnection has occurred (or a signal received as to an impending connect), the method 200 continues at another decision block 252 that decides whether to terminate communication via an IP protocol. If the decision block 252 decides to not terminate communication, the method 200 continues, for example, at the control block 244; otherwise, the method 200 continues, for example, at the communication block 210 and so forth as indicated in FIG. 2 for S1.

Figure 4:
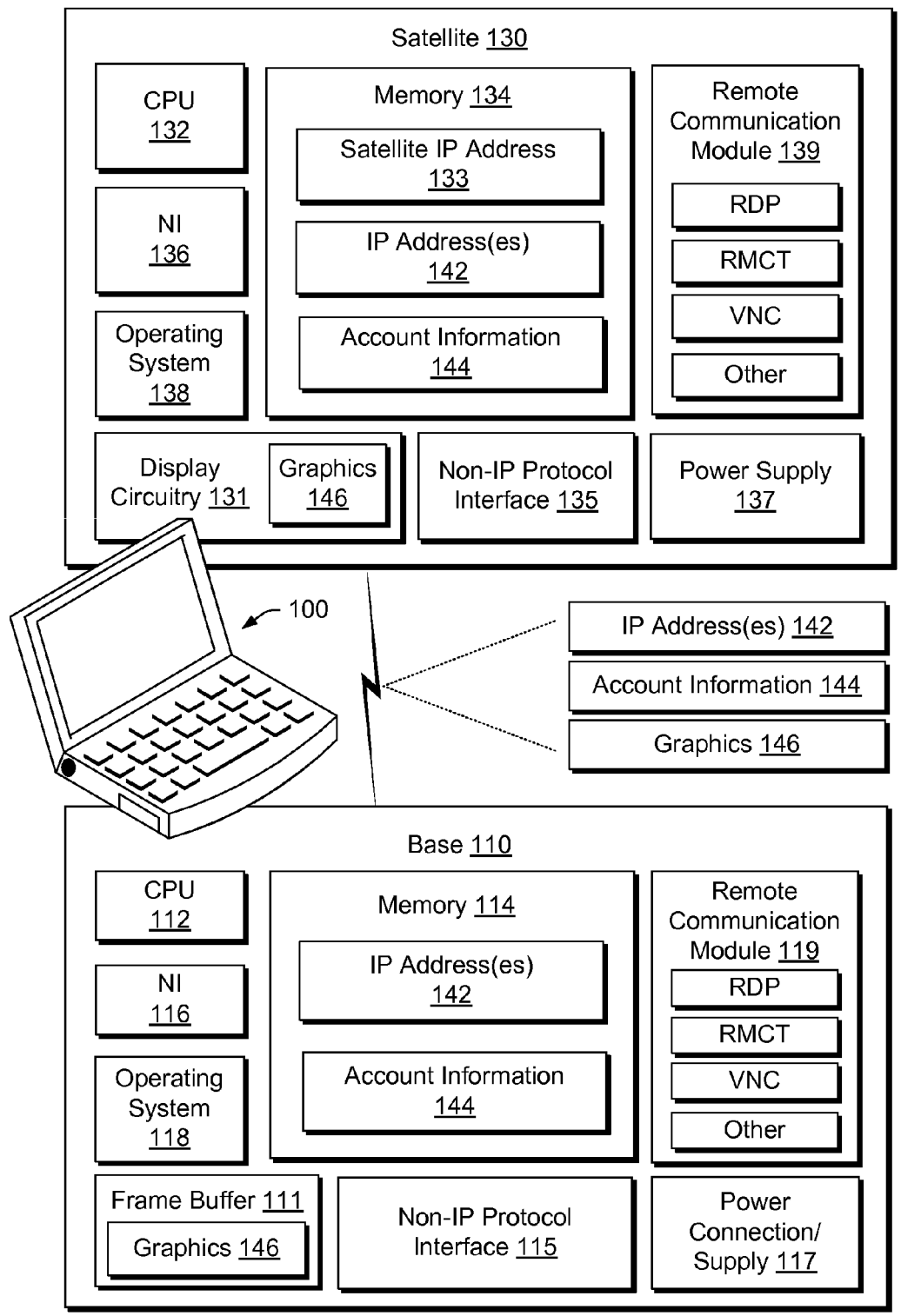
FIG. 4 is a diagram of an example of a system and various features, some of which may be optional.

FIG. 4 shows a block diagram of the system 100 of FIG. 1 with additional features. In the example of FIG. 4, the base 110 includes a frame buffer 111, a power connection/supply 117, an operating system 118 (optionally enabled via a hypervisor) and a remote communication module 119. Further, the memory 114 is shown as storing one or more IP addresses 142 and account information 144 (e.g., for one or more accounts) and the frame buffer 111 as storing graphics 146.

With respect to graphics, various arrangements are possible for a system. For example, a satellite may optionally include a graphics card or GPU (e.g., consider NVIDIA® technologies) configured to execute commands, render graphics, etc. In various graphical rendering arrangements, a satellite may act as a server (e.g., a GPU-based OpenGL server) and a base as a client (e.g., CPU-based OpenGL client). In a particular example, a satellite includes a GPU configured as an OpenGL server and a base or other resource includes a CPU configured as an OpenGL client where OpenGL state changes, texture and vertex data, and rendering commands are communicated from an application to the OpenGL client and where the client transforms these items and then forwards them to the GPU-based OpenGL server on the satellite. In turn, the satellite renders the graphics to a display.

In the example of FIG. 4, the satellite 130 includes display circuitry 131 (e.g., for rendering of the graphics 146), a power supply 127, an operating system 138 and a remote communication module 139. Further, the memory 134 is shown as storing a satellite IP address 133, the one or more IP address 142 associated with the base 110 and the account information 144; the latter two typically being communicated from the base 110 to the satellite 130 (e.g., via a non-IP protocol interface enabled by components 115 and 135, which may be assumed to not have various security concerns commonly associated with an IP protocol network interface). As described herein, where account information is communicated to a satellite, it is preferred that such communication occur in a secure manner, for example, in a manner that does not rely on a network such as the Internet; noting that for purposes of authentication, the satellite will normally communicate stored account information via a network such as the Internet (e.g., optionally using one or more security techniques; consider SSH, etc.).

As indicated in FIG. 4, the base 110 communicates the one or more IP addresses 142, the account information 144 and graphics to the satellite 130 where the one or more IP addresses 142 and the account information 144 may be stored in the memory 134, for example, to enable transitioning from S1 to S2.

With respect to the remote communication modules 119 and 139, these may include one or more sets of instructions. For example, the modules 119 and 139 may include instructions for technologies such as a "Remote Desktop Protocol" (e.g., RDP, Microsoft Corporation), "Real-time Multimedia Collaboration Technology" (e.g., RMCT, Lenovo Corporation), a "Virtual Network Computing" (e.g., VNC), etc.

RDP is based on, and an extension of, the ITU T.120 family of protocols. On a server end, RDP uses its own video driver to render display output by constructing the rendering information into network packets by using RDP protocol and sending them over the network to a client end. On the client end, RDP receives rendering data and interprets the packets into corresponding graphics device interface (GDI) API calls. For an input path, client mouse and keyboard events (e.g., also consider touch screen or other input mechanisms) are redirected from the client end to the server end. On the server end, RDP uses its own on-screen keyboard and mouse driver to receive these keyboard and mouse events.

In a Remote Desktop Services environment, an application runs entirely on the Remote Desktop Session Host (RD Session Host) server. In general, the client performs no local processing of application software; the server transmits graphics to the client and the client transmits the user input back to the server.

With respect to VNC, a VNC server is a program that executes on a device, for example, that shares its screen to allow a client to take control of it. A VNC client (or viewer) is a program that watches, controls, and interacts with the server; noting that the client controls the server. The VNC protocol (RFB) is based on communication of graphic primitives from server to client (e.g., "Put a rectangle of pixel data at the specified X, Y position") and event messages from client to server. VNC may be tunneled over an SSH or VPN connection which can add an extra security layer (e.g., with stronger encryption).

As described herein, a computing system may include a first portion that includes a processor, memory, an IP protocol network interface and a non-IP protocol communication interface; a second portion that includes a processor, memory, an IP protocol network interface and a non-IP protocol communication interface; circuitry configured to establish a communication link via the non-IP protocol communication interfaces for communication between the first portion and the second portion; and circuitry configured to establish, in response to termination of the communication link, a network connection via the IP network interface of the first portion, the network connection enabling the first portion to use an executing operating system. In the foregoing system, the operating system may execute on the second portion (e.g., a base) or on a remote server; noting that in either instance, hypervisor technologies may be involved. As shown in various examples, the first portion (e.g., a satellite) may include a display. The second portion may include a dock configured for docking the first portion (e.g., to dock a satellite display/tablet portion to a base portion). In various examples, memory of a first portion may be configured to store an IP address associated with a computing device that executes an operating system and configured to store logon information for accessing and using the operating system. Various examples may include a trusted platform module, for example, configured to enable a first portion to use an executing operating system.

Figure 5:
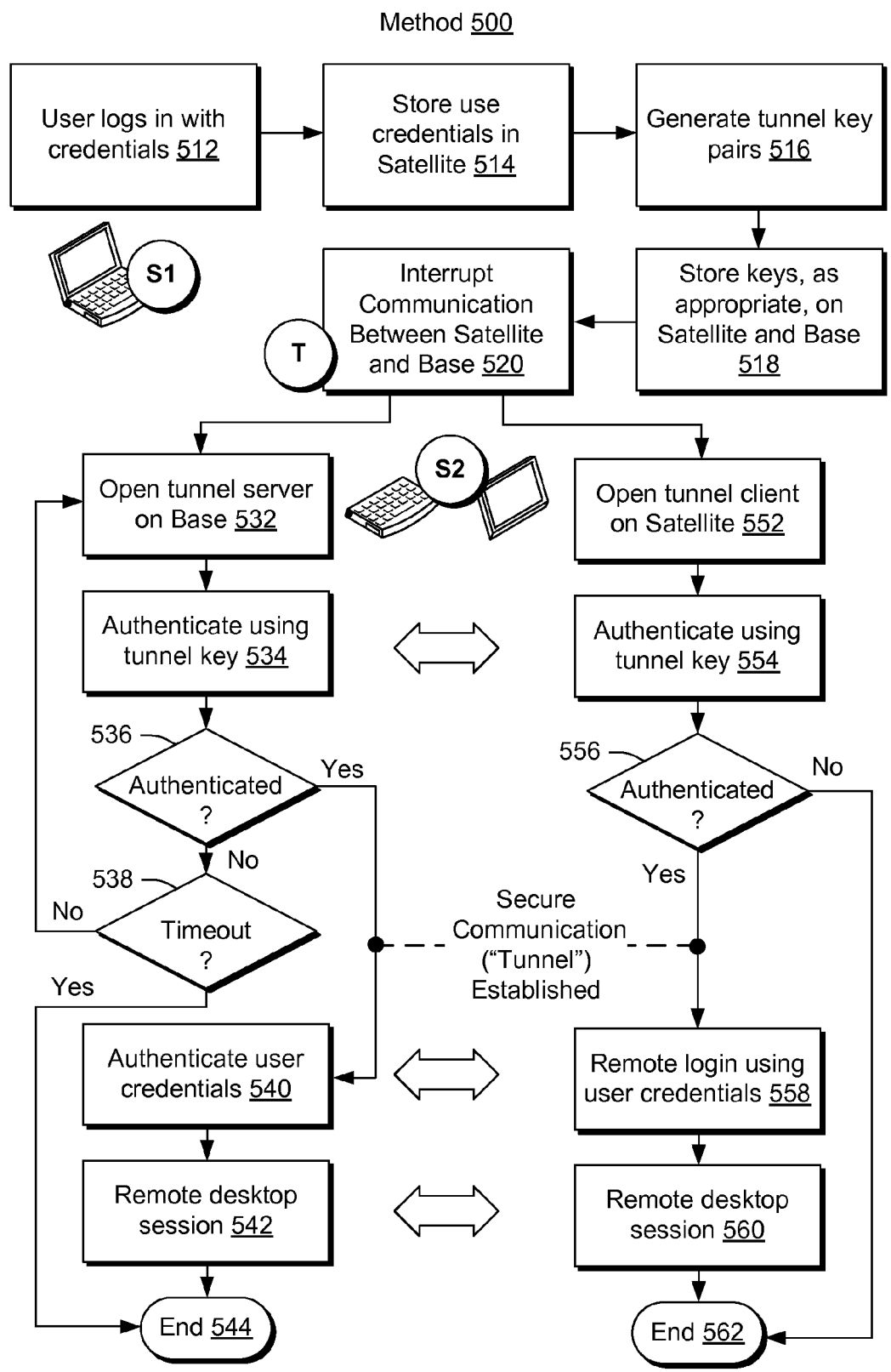
FIG. 5 is a diagram of an example of a method for establishing a secure tunnel and communicating credentials via the secure tunnel.

FIG. 5 shows an example of a method 500 that can transition from S1 to S2 using tunnel key authentication to establish secure communication followed by user credential authentication where credentials are communicated securely, for example, to seamlessly transition to a remote an operating system session.

The method 500 commences in a login block 512 where a user logs in to a system using credentials (e.g., a user name and a password, biometric information, etc.). A storage block 514 stores the credentials in a satellite of the system. A generation block 516 generates tunnel key pairs. Key generation may be enabled wholly or in part by any of a variety of technologies (e.g., SSH associated technologies, a trusted platform module, Cygwin, PuTTY, etc.). Another storage block 518 stores the keys, as appropriate, on the satellite and a base of the system (e.g., as dictated by authentication technique). As shown in the example of FIG. 5, at this point, the system may be transitioned from S1 to S2, for example, per an interruption block 520.

Upon occurrence of an interruption, events may occur on both a base and a satellite of a system. For example, according to the method 500 of FIG. 5, an open block 532 executes on the base and an open block 552 executes on the satellite. Where the satellite seeks to connect with the base, an authentication block 534 executes on the base using its stored tunnel key and an execution block 554 executes on the satellite using its stored tunnel key. According to the example of FIG. 5, an authentication decision block 536 executes on the base and an authentication decision block 556 executes on the satellite.

As to the base, if the decision block 536 decides that the tunnel key authentication has not occurred, then a timeout decision block 538 follows, which may cause the method 500 to continue at the open block 532 ("No" timeout) or to terminate at an end block 544 ("Yes" timeout). If the decision block 536 decides that tunnel key authentication occurred, then a secure communication tunnel is established between the base and the satellite and the method 500 continues at an authentication block 540 that acts to authenticate user credentials as stored on the satellite, transmitted by the satellite and received by the base via the established secure communication tunnel.

As to the satellite, a parallel process depends on the authentication decision block 556. If the tunnel key authentication does not occur, the method 500 terminates at an end block 562; however, if tunnel key authentication does occur, then a secure communication tunnel is established between the base and the satellite and the method 500 continues at a remote login block 558 where user credentials stored on the satellite are sent from the satellite to the base via the established secure communication tunnel. In the example of FIG. 5, where the credentials are authenticated per block 540, a remote desktop session is established via blocks 542 and 560 where the remote desktop session may rely on communication via the secure tunnel, as established using the generated key pair (see, e.g., block 516). While the example of FIG. 5 mentions "tunnel keys" (see, e.g., TLS protocols) one or more other security technologies may be implemented to establish secure communication.

FIG. 6 shows an example of a method 600. In a reception block 610, the method 600 includes receiving an IP address via a non-IP protocol communication interface, the IP address associated with an operating system environment established on a computing device. In a storage block 620, the method 600 includes storing the received IP address in memory. In an access and transmission block 630, the method 600 includes, responsive to a cessation of communication via the non-IP protocol communication interface, accessing the IP address stored in memory and transmitting the accessed IP address via an IP protocol network interface. In a reception block 640, the method 600 includes receiving information via the IP protocol network interface, the information issued by the operating system environment established on the computing device associated with the IP address. As mentioned, where a satellite includes display circuitry, a method may include rendering at least some of the received to a display. In the method 600, the non-IP protocol communication interface may be a wired communication interface. In the method 600, information received via the IP protocol network interface may occur responsive to transmitting information via the IP protocol network interface.

As described herein, a method such as the method 600 may include receiving logon information via a non-IP protocol communication interface where the logon information is associated with an operating system environment established on a computing device. Such a method can allow for a relatively seamless transition to a remote session (see, e.g., transition from S1 to S2 of FIGS. 1 and 2). Such a method may include storing received logon information in memory and acting, in response to receipt of information via an IP protocol network interface, to access the logon information stored in memory and to transmit the accessed logon information via the IP protocol network interface.

As described herein, cessation of communication may corresponds to termination of a wired connection, violation of a proximity condition, termination of a communication link that relies on a non-IP protocol communication interface, etc. As to the proximity condition, consider a system configuration where IP or other information indicates that a satellite is a certain distance from a base or other network device. Upon violation of a proximity condition (e.g., distance), a remote session may be terminated (e.g., for purposes of security). Other conditions that may trigger termination may involve factors such as number of intervening nodes, a specific intervening node address, a range of addresses, bandwidth, error rate, etc.

Figure 7:
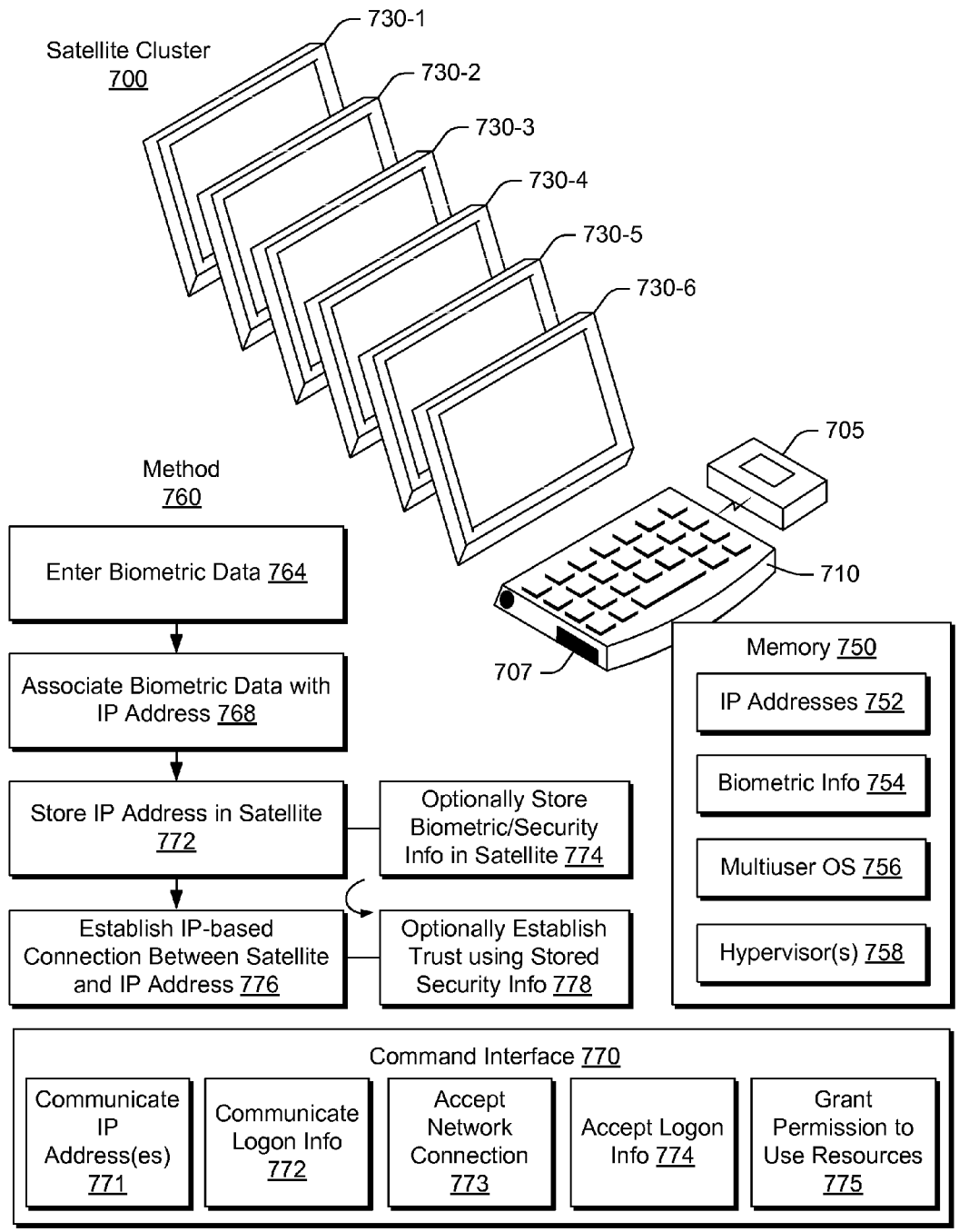
FIG. 7 is a diagram of examples of a satellite cluster, a method, memory and command interface modules.

FIG. 7 shows an example of a system that includes a satellite cluster 700 along with various features 750, an example of a method 760 and an example of a command interface 770.

The cluster 700 includes satellites 730-1 to 730-6 that operate cooperatively with a base 710. In the example of FIG. 7, the base 710 is in communication with a security device 705 such as a biometric fingerprint reader. The base 710 may also include or have access to a trusted platform module (TPM) 707 (e.g., for security, key generation, etc.). As shown, the base 710 may include or have access to memory 750 where the memory 750 stores information such as one or more IP addresses 752, biometric information 754, instructions for one or more multiuser operating systems 756 and instructions for one or more hypervisors 758.

The method 760 includes an entry block 764 for entry of biometric data (e.g., a fingerprint or retina scan via the device 705). An association block 768 associates the entered biometric data with an IP address, for example, according to a table or other data structure stored in the memory 750. A storage block 772 stores the IP address in memory of a satellite (e.g., one of 730-1 to 730-6). An optional storage block 774 may also act to store biometric or other security information in the satellite. An establishment block 776, establishes an IP-based connection between the satellite and a device at the stored IP address. An optional establishment block 778 may act to establish trust with the device at the IP address using the stored security information. While the foregoing example refers to a single satellite, authority may be granted to a user for "checking out" two or more satellites (e.g., for a shared session, side-by-side display, etc.).

The satellite cluster 700 and the method 760 may be implemented, for example, in a workplace where workers enter biometric information and select an indicated satellite (e.g., as indicated by a display being lit up or a displayed graphic or message) where the satellite establishes communication to an operating system environment executing on a base or a server. A base or a server may be optionally configured to execute a hypervisor, which may be configured to support multiple operating system environments optionally accessible by multiple users (e.g., user accounts). As described herein, each worker may have an account associated with an operating system environment on a server accessible by a satellite as indicated in the example system, methods, devices, etc. of FIG. 7 (e.g., or elsewhere herein).

With respect to the command interface 770, this interface may be in the form of instructions stored in memory and executable by a computing device. The interface 770 may be implemented as one or more application programming interfaces (APIs). In the example of FIG. 7, the interface 770 includes a communication module 771 configured for communicating one or more IP addresses (e.g., an exposed interface callable by a satellite), a communication module 772 configured for communicating logon information or other security information, an network connection acceptance module 773, callable for purposes of deciding if or how to accept a network connection, a logon information acceptance module 774, callable for purposes of accepting, authenticating, etc., logon information and a permission module 775 configured for granting permission to use one or more resources (e.g., OS, hardware, networked, application, etc.).

As described herein, one or more interfaces may be configured: to communicate an IP address, the IP address associated with a computing device executing an operating system; to communicate logon information, the logon information associated with the operating system; to accept a network connection based at least in part on the IP address; to receive logon information via the network connection; and, responsive to authentication of the logon information, to provide permission to use the operating system. Such an interface may be implemented as one or more APIs (e.g., based on processor-executable instructions stored in one or more computer-readable media). In a particular example, an operating system is configured to expose one or more application programming interfaces via a non-IP protocol communication interface, the one or more APIs configured to communicate an IP address and to communicate logon information (e.g., from a base to a satellite).

With respect to a hypervisor, a hypervisor may be or include features of the XEN® hypervisor (XENSOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform (e.g., satellite, base, server, etc.).

As described herein, various acts, steps, etc., can be implemented as instructions stored in one or more computer-readable media. For example, one or more computer-readable media can include computer-executable (e.g., processor-executable) instructions to instruct a device.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 8:
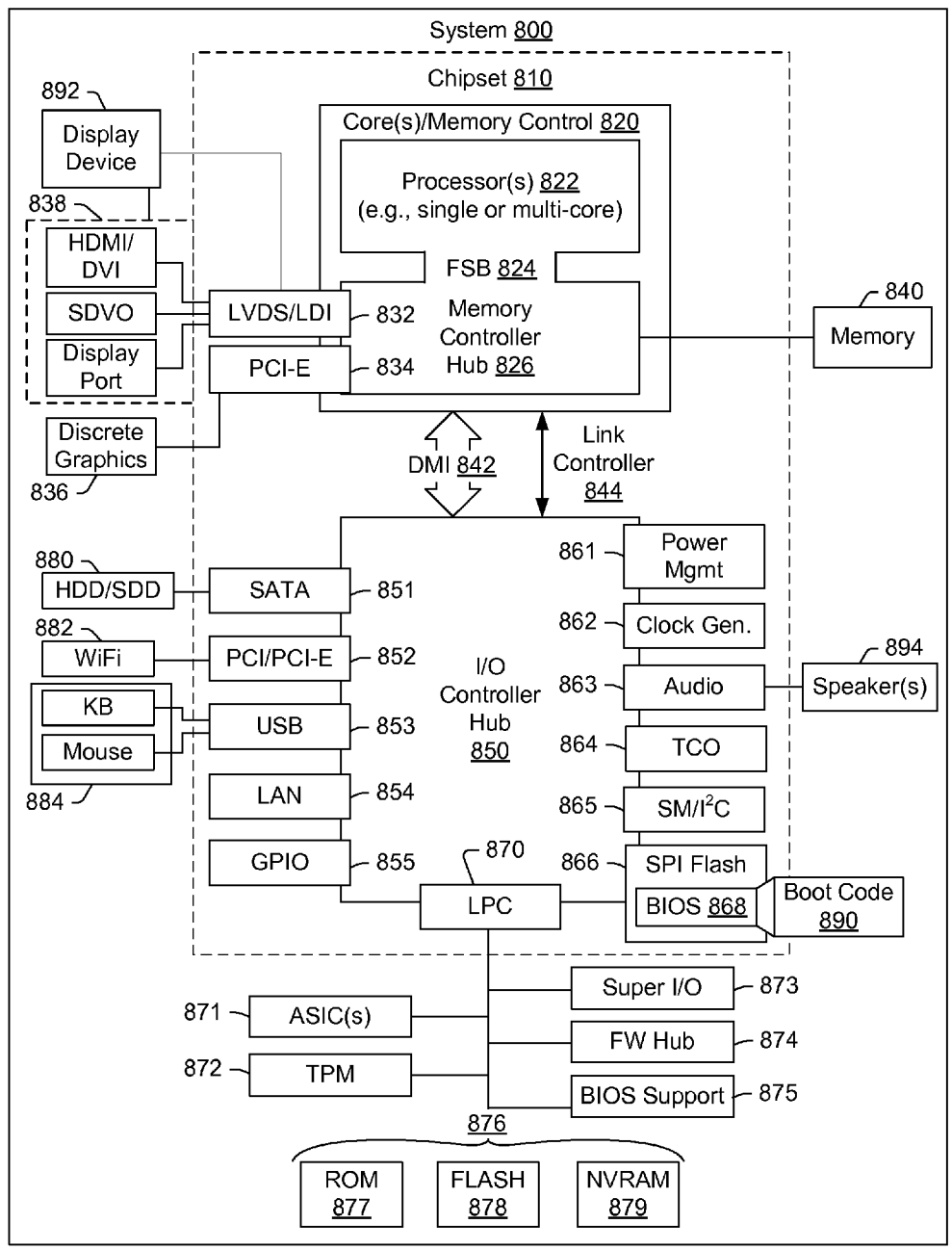
FIG. 8 is a diagram of an example of a machine, some or all of the features thereof may form part or all of a satellite, a base, a server or other device or system.

While various examples circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), mice and various other devices (e.g., cameras, phones, storage, media players, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system or component seeking access is the expected system or component.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
  as part of a login procedure, receiving user credential information via an input mechanism of a computing device that comprises a keyboard and a connector for connecting the computing device to a display device, the user credential information to initiate an active session with an operating system environment that comprises an application programming interface, the operating system environment executing on the computing device;
  using the application programming interface and a non-IP protocol communication interface of the computing device for communicating an IP address associated with the computing device and for communicating the user credential information from the computing device to the display device;
  storing the IP address and the user credential information in memory of the display device;
  interacting with the active session of the operating system environment executing on the computing device through communication between the computing device and the display device via the non-IP protocol communication interface;
  responsive to interruption of the communication via the non-IP protocol communication interface of the computing device, launching a remote desktop session on the display device for accessing the IP address stored in memory of the display device and transmitting the accessed IP address via an IP protocol network interface of the display device;
  responsive to the transmitting, receiving via the IP protocol network interface of the display device, a challenge issued by the operating system environment executing on the computing device associated with the IP address;
  responsive to receiving the challenge via the IP protocol network interface of the display device, the display device accessing the user credential information stored in memory of the display device and transmitting the user credential information from the display device via the IP protocol network interface of the display device to the computing device for authentication of the user credential information by the computing device for interacting with the active session of the operating system environment executing on the computing device; and
  responsive to authentication of the user credential information by the computing device, continuing interaction by the display device with the active session of the operating system environment executing on the computing device through communication between the display device and the computing device via the IP protocol network interface.

2. The method of claim 1 wherein the non-IP protocol communication interface comprises a wired communication interface.

3. The method of claim 1 wherein the interruption of the communication corresponds to termination of a wired connection.

4. The method of claim 1 wherein the interruption of the communication corresponds to violation of a proximity condition.

5. The method of claim 1 wherein the interruption of the communication corresponds to termination of a communication link that relies on the non-IP protocol communication interface.

6. The method of claim 1 further comprising rendering at least some information associated with the received challenge to a display of the display device.

7. A computing system comprising:
  a display portion that comprises a processor, memory, an IP protocol network interface and a non-IP protocol communication interface;

a keyboard portion that comprises a processor, memory, an IP protocol network interface, a non-IP protocol communication interface, and a connector for connecting the keyboard portion to the display portion;

circuitry configured to establish a communication link via the non-IP protocol communication interfaces for communication between the display portion and the keyboard portion to interact with an active operating system session established via user credentials input via the keyboard portion as part of a login procedure wherein an operating system that supports the operating system session executes on the keyboard portion;

circuitry configured to communicate via the non-IP protocol communication interfaces an IP address associated with the keyboard portion and the user credentials from the keyboard portion to the display portion through use of an application programming interface associated with the operating system that executes on the keyboard portion;

circuitry configured to store the IP address associated with the keyboard portion and to store the user credentials in the memory of the display device; and circuitry configured to establish, in response to termination of the communication link via the non-IP protocol communication interfaces, a network connection between the IP network interfaces of the display portion and the keyboard portion, the network connection enabling the display portion to continue to interact with the active operating system session of the operating system that executes on the keyboard portion, wherein the circuitry configured to establish the network connection comprises circuitry to launch a remote desktop session by the display portion wherein the remote desktop session accesses the IP address stored in the memory of the display portion, transmits the accessed IP address via the IP protocol network interface of the display portion, and, in response to the transmission, receives a challenge from the keyboard portion via the IP network interface of the display portion and, in response to receipt of the challenge, circuitry of the display portion accesses and transmits the stored user credentials via the IP network interface of the display portion for authentication by the keyboard portion to continue to interact with the active operating system session of the operating system that executes on the keyboard portion.

* * * * *